March 15, 1966 E. W. MADSEN ET AL 3,241,017
PULSE SUPPLYING DEVICE EMPLOYING VARIABLE-OSCILLATOR AND
PRESETTABLE COUNTER FOR CONTROLLING SPEED AND
DIRECTION OF MOTOR
Filed June 27, 1963 2 Sheets-Sheet 1

INVENTORS
Elmer W. Madsen
Albert C. Leenhouts
BY
ATTORNEYS

INVENTORS
Elmer W. Madsen
Albert C. Leenhouts
BY
Johnson and Kline
ATTORNEYS

United States Patent Office 3,241,017
Patented Mar. 15, 1966

3,241,017
PULSE SUPPLYING DEVICE EMPLOYING VARIABLE-OSCILLATOR AND PRESETTABLE COUNTER FOR CONTROLLING SPEED AND DIRECTION OF MOTOR
Elmer W. Madsen, Bristol, and Albert C. Leenhouts, Granby, Conn., assignors to The Superior Electric Company, Bristol, Conn., a corporation of Connecticut
Filed June 27, 1963, Ser. No. 291,074
7 Claims. (Cl. 318—138)

The present invention relates to an electrical device or circuit that produces a preselected number of electrical pulses per cycle of operation and then ceases and more particularly to such a circuit in which the number of pulses per cycle may be selected to a desired number within the capabilities of the device.

In some applications, it has been found desirable to have an electrical device which upon actuation produces a selectable number of pulses and then ceases operation until either manually or automatically actuated again to repeat the cycle to again produce the same number of pulses. One such application is in the field of stepping motors or motors which rotate a predetermined increment for each pulse. Thus when an electric circuit that produces a selected number of pulses is connected to actuate such a stepping motor, then the motor will be made to advance as many increments as the number of pulses and hence by controlling the number of pulses, the total movement of the motor is thereby predicted. After the cessation of movement of the motor the electric device may be actuated again to repeat the cycle, the manner of actuation either being manual, time, sequence or depending upon completion of a subsequent operation.

It is accordingly an object of the present invention to provide an electric pulse supplying device which upon actuation produces a predetermined number of pulses at a substantially constant frequency and then ceases operation upon completion of the desired number of pulses and in which the number of pulses may be preselected.

Another object of the present invention is to provide in such a device for the frequency of the pulse to be adjusted and for after completion of each cycle to have the device reset itself so that it may be actuated again to produce the number of pulses which have been selected.

A further object of the present invention is to provide an electric pulse supplying device which is designed to produce pulses of very low frequency, i.e., on the order of 1000 cycles per second or less and which is relatively immune to electrical disturbances or noise.

In carrying out the present invention, a feature thereof resides in a device that has a pulse source that produces pulses at a desired frequency and output terminals wherein these pulses appear to be used, for example, in controlling a stepping motor. Also connected to the output terminals is a counting circuit composed of a plurality of binary counters which, according to the present invention, are made relatively immune to electric noise and disturbances above a relatively low frequency that would alter the number of pulses selected. The counters have a plurality of conditions with there being only one condition for each pulse and thus with each pulse appearing during the cycle a known condition of the counter occurs. The device further includes selecting means having a plurality of positions, one for each of the conditions of the binary counters, and hence when the one condition of the binary counters appears that corresponds to the position of the selecting means, there is a signal produced which through a control gate ceases the appearance of pulses at the output terminals.

The control gate has two states, one which permits the appearance of pulses at the output terminals and the other which prevents its appearance. Upon the binary counter condition and the selecting means position corresponding, the control gate is caused to change its state to that which prevents output pulses from appearing at the output terminals, thus ceasing the cycle. For repeating the cycle, the control gate must be shifted to its first state wherein it permits pulses to appear at the output terminals until completion of the cycle and this may be done either manually or automatically.

In addition as the electric pulse supplying device is preferably employed to actuate a motor of the stepping type, the pulse source is made with an adjustment which enables the frequency of the pulses to be altered and thereby the speed of the motor. For enabling exterior apparatus to be actuated after completion of the cycle, the present invention provides the control gate when it shifts from the one state to the other, to produce a completion signal that may be utilized as a signal for the external apparatus.

Other features and advantages will hereinafter appear.

Figure 1:
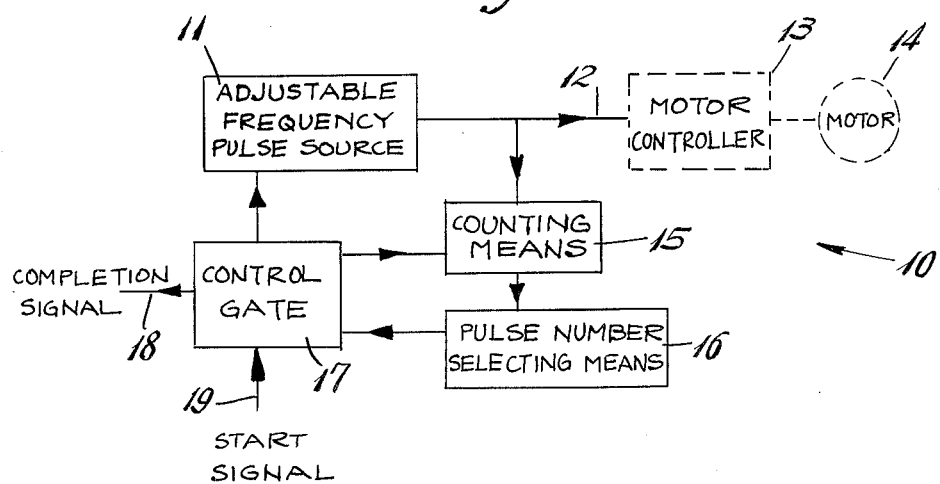
FIGURE 1 is an electrical block diagram of the electric pulse supplying device of the present invention.

Referring to the drawing, FIGURE 1, the electric pulse supplying device of the present invention is generally indicated by the reference numeral 10 and as shown includes an adjustable frequency pulse source 11 that produces pulses on an output line 12 to a motor controller indicated in the dotted block 13 which in turn controls a motor 14. The motor controller is of the type shown in U.S. patent application, Serial No. 65,039, filed October 26, 1960, now Patent No. 3,117,268, granted January 7, 1964, while the motor is of the type shown in U.S. Patent No. 2,982,872, entitled, Electric Motor. Thus for each pulse received by the motor controller from the line 12, the motor 14 is caused to move one increment and as will be more fully after appreciated the motor controller 13 may control the direction of rotation of the motor 14 by receiving pulses on one channel for clockwise rotation and the opposite channel for counterclockwise rotation. Moreover, the speed of movement of the motor may be adjusted, within the limits of the motor, by altering the frequency at which the pulses are supplied.

In addition, to producing pulses in the line 12, the pulse source also feeds the same pulses to a counting means 15 which, as will hereinafter be explained, constitutes at least one decade of binary counters. The counting means 15 has a plurality of conditions with each condition being indicative of the number of pulses that has appeared in the output line 12 and hence with each pulse the condition of the counting means 15 changes. Connected to the counting means is a pulse number selecting means 16 which has a plurality of positions, there being as many positions as there are conditions of the counting means. With only one position of the pulse number selecting means capable of being set, when this set position corresponds to the one condition of the counting means then there is a signal passed from the selecting means 16 to a control gate 17.

The control gate 17 has two states one of which permits output pulses to appear at the output line 12 and the other prevents the appearance of pulses at the output line 12. It is accordingly connected to the pulse source 11 to control the passage of pulses and in addition performs a function in the other state of resetting the counting means 15 to in effect zero. Moreover, in the other state of the control gate, it supplies a completion signal through a line indicated by the reference numeral 18 which may be employed for initiating operation of external apparatus, such as a machine tool after the completion of a cycle. Each cycle of a predetermined number of pulses is initiated by a start signal appearing in a line 19 that causes the control gate to be shifted to its first state at which it remains until actuated to its other state by the passage of a signal from the pulse number selecting means 16.

Figure 2:
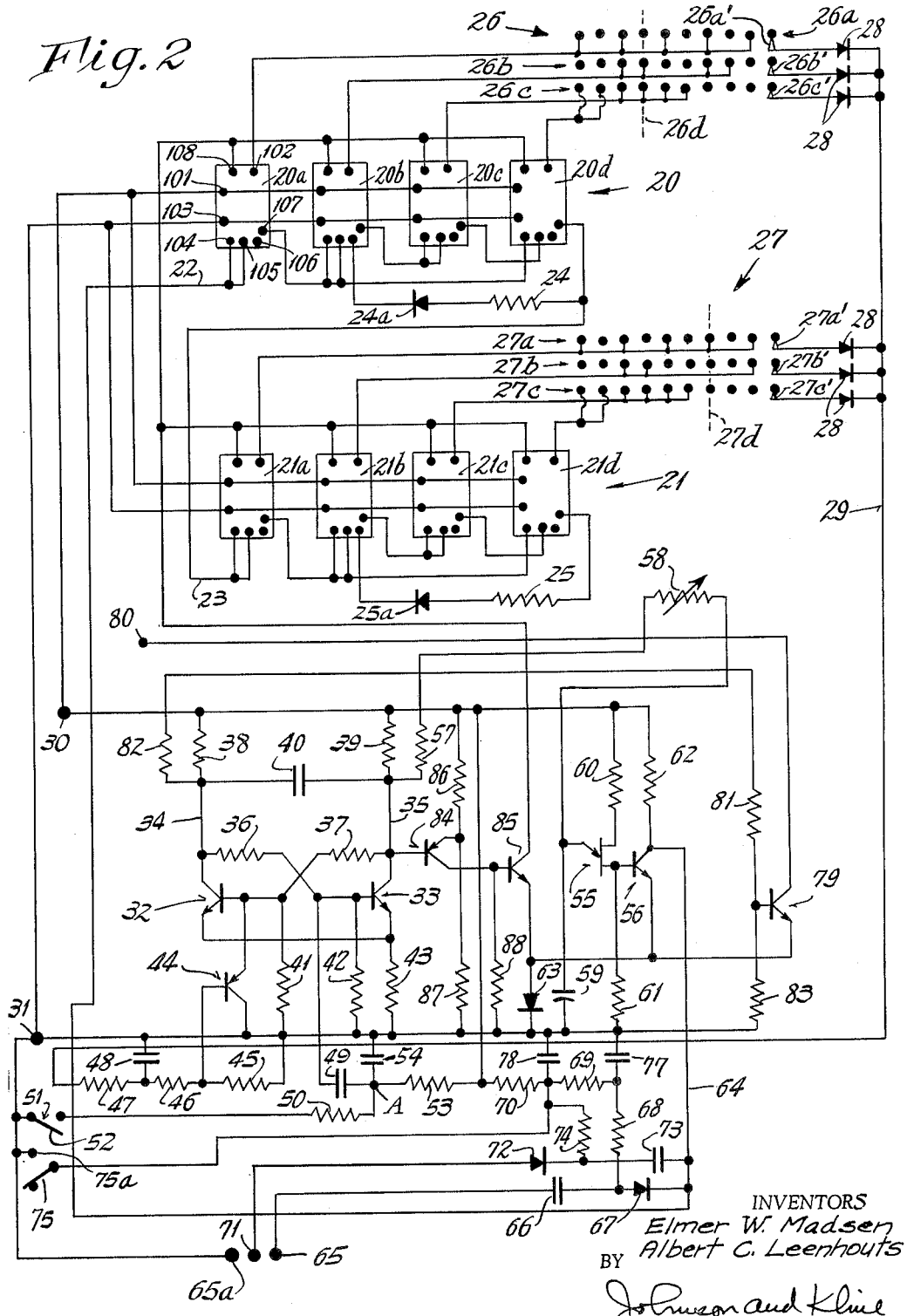
FIG. 2 is an electrical schematic diagram of the device.

Referring to the schematic diagram, FIG. 2, the counting means 15 includes a first decade 20 of binary counters 20a, 20b, 20c and 20d and a second decade 21 of binary counters 21a, 21b, 21c and 21d. Each of the counters 20a through 20d and 21a through 21d consists of a bistable flip-flop, one of which is more specifically shown in FIG. 3. The counters 20a through 20d are connected to be a binary coded decimal counter for the first digit of the number of pulses to be supplied for a cycle and the second decade 21a through 21d is also a binary coded decimal counter for the second digit of the number of pulses per cycle. With the use of two decades, as shown, the number of pulses which may be supplied per cycle is 1 through 99 though it will be appreciated that if it is desired to produce a device capable of supplying more pulses per cycle additional decades may be provided. If another decade is employed the pulses per cycle to be controlled will fall within the range of 1 to 999 and hence while only two decades are shown the present invention contemplates utilizing a different number if so desired.

By the use of four binary counters, it is possible to have 16 states or separate conditions of each decade. However, as it is desired to have the cycles selected be in the decimal system, the present invention provides for eliminating six unused conditions of each decade. This is achieved by detecting the condition for the number 9 and rerouting the next count or pulse so that it will reset the decade to zero and generate a carryover to the next decade. Such procedure is well known to those skilled in the art.

The pulse from the output 12 is received by the initial counter 20a of the decade 20 on a line 22 while the carryover pulse from the decade 20 to the decade 21 is in a lead 23. In the decade 20, from the counter 20d to the counter 20b, there is included a resistance 24 and a diode 24a for changing the decade to a decimal counter while the decade 21 similarly has a resistance 25 and diode 25a to achieve the same purpose.

It will be understood that the first digit decade counter 20 has ten separate conditions, one for each of the first digit number of pulses received by it on the line 22. Similarly the decade counter 21 has ten separate conditions, one for each of the second digit number of pulses received by the first decade.

The pulse selecting means 16 in the embodiment shown specifically consists of a three-gang ten position switch 26 electrically connected to the first decade 20 and an identical second switch 27 electrically connected to the decade 21. The first gang 26a of the switch 26 has connections from positions 1, 3, 5, 7 and 9 of the switch, the position being indicated by the dots on the binary counter 20a. The second gang 26b of the switch has positions 2, 3, 6 and 7 connected to the counter 20b with the third gang 26c having positions 4, 5, 6 and 7 connected to the counter 20c and positions 8 and 9 to the counter 20d. The switch 27 similarly has gangs 27a, 27b and 27c with the positions of the gangs being connected to the counters 21a through 21d in the same manner as the switch 26 is connected to the counters 20a through 20d. It will thus be appreciated that the decade 21 and switch 27 are the same as decade 20 and switch 26. The switch 26 has a switch contact for each gang denoted as 26a′, 26b′ and 26c′ and these switch contacts are movable together to any one of the ten positions, the solid line position being the zero position. The switch 27 is of similar construction having contacts 27a′, 27b′ and 27c′ which are also movable in unison to only one of the ten positions of this switch and are shown in the zero position of the switch.

By positioning the contacts of the switch 26 at any one of its ten positions the unit digit of the pulses in the cycle may be selected while the positioning of the contacts 27a′, 27b′ and 27c′ of the switch 27 at any one of its ten positions, the ten's digit of the output pulses per cycle is selected. Each of the contacts is connected in parallel to an output lead 29, through its own diode, the diodes being indicated by the reference numeral 28.

It will thus be appreciated that the pulses produced by the pulse source 11 are fed to the counting means 15 through the lead 22 and that an output signal is produced in the lead 29 when the condition of the counting means 15 corresponds to the position of the pulse number selecting means 16, the latter being determined by the position of the contacts of the switches 26 and 27.

The device 10 has a direct current positive input terminal, generally indicated by the reference numeral 30 and a negative input terminal 31. In essence the control gate 17 consists of a base triggered bistable flip-flop similar to a binary counter having one state when a transistor 32 conducts and another state when a transistor 33 conducts. The control gate 17 includes for the transistor 32 a collector output point 34 and for the transistor 33 a similar collector output point 35. Base coupling resistors 36 and 37 are connected between the high points 34 and 35 and the bases of the transistors 33 and 32 respectively. The positive terminal 30 is connected to the collectors through an RC network consisting of resistors 38 and 39 and condenser 40. The particular function of the RC network constitutes an important facet of the present invention and is hereinafter more fully set forth. In addition, biasing resistors 41, 42 and 43 for the bases and the emitters are connected between these elements of the transistors 32 and 33 and the negative supply terminal 31. A PNP transistor 44 is connected between the base of transistor 32 and the negative terminal 31, with the base of the transistor 44 being connected through a resistance 45 to the negative supply terminal 31 and through filtering and bias elements, resistors 46 and 47 and condenser 48 to the lead 29 in which the signal from the pulse number selecting means appears and the terminal 31. Moreover, the control gate 17 has the base of transistor 33 connected through a coupling condenser 49 to a point A with the point A being connected through a resistor 50 to a normally opened start switch 51, the latter having a switch arm 52 connected to the negative terminal 31. The point A is additionally through a resistor 53 connected to the positive supply 30 and through a condenser 54 to the negative terminal 31.

It will be appreciated with this structure that the control gate may have its state changed by applying a trigger signal through the transistor 44 to the base of transistor 32 when it is conducting or through the condenser 49 to the base of transistor 33 when it is conducting. The transistor 44 is normally biased into non-conduction by a positive bias voltage applied to its base through the elements 46 and 47 that is somewhat larger than the positive voltage on its emitter. However, upon a signal appearing in the output line 29, which is a change from a relatively high positive voltage to a positive voltage of lower value, the positive bias on the base decreases to enable transistor 44 to conduct which when the transistor 32 is conducting triggers the control gate and causes it to change its state from the transistor 32 being conductive to the transistor 33 being conductive. Similarly for effecting a change from this last-mentioned state to the first-mentioned state, closure of the switch 51 applies a low voltage to the point A which through the coupling condenser 49 decreases the positive potential at the base of transistor 33 when it is conducting to effect the change in state. The states of the two transistors 32 and 33 remain as set in the absence of a triggering signal.

For supplying pulses at a substantially constant frequency that may be however adjusted, the adjustable frequency pulse source 11 includes a unijunction transistor 55 and an NPN transistor 56. The frequency of the conduction between the emitter and base of the unijunction transistor 55 is determined by an RC network consisting of a resistor 57, an adjustable resistor 58 and a condenser 59 connected to the emitter of the unijunction transistor 55 between the collector output point 35 and the negative terminal 31. Biasing and current control resistors 60 and 61 are connected in the base circuit of the transistor 55 as is the base of the transistor 56. A limiting resistor 62 is connected between the positive supply 30 and the collector of transistor 56 while its emitter is connected through a biasing diode 63 to the negative terminal 31. The output of the pulse source 11 is through a lead 64 connected to the collector and consists of a relatively high potential when the transistor 56 is not conducting and a relatively low potential when it is conducting, the latter being the pulse. Thus the pulse source functions only when the point 35 has a high potential which occurs only when the control gate 17 is at the one state when transistor 32 is conducting because at its other state the potential at the point 35 is too low to cause effective conduction of the unijunction transistor 55.

For effecting the change of the output voltage in the lead 64 from a relatively high voltage to a low voltage into a negative pulse that appears at output terminals 65 and 65a, there is provided a condenser 66 and a diode 67 between the lead 64 and terminal 65 with a junction intermediate thereof connected through resistors 68, 69 and 70 to the positive lead 30. By this structure, the diode 67 when the transistor 56 is not conducting has the same positive potential at the lead 64 as at its other side, while when the transistor 56 conducts, the potential in the lead 64 is lowered causing current to flow through the diode 67, reducing the potential at the junction of the diode 67 and condenser 66 and thereby effecting a negative pulse at the terminal 65.

The present invention, as previously set forth, has particular suitability when used with an electric motor controller. One such controller has in addition to a terminal for effecting forward rotational movement of a motor controlled thereby another terminal on which negative pulses produce a reverse rotation of a motor. For controlling the direction of motor movement, there is provided in the electric pulse supplying device of the present invention another output terminal 71 taken with terminal 65a at which negative pulses may appear and which is connected through a diode 72 and condenser 73 to the lead 64. In addition between the elements 72 and 73, there is a resistance 74 that connects to a single pole double throw switch 75 having one terminal 75a connected to the negative supply 31. The switch 75 is shown in the condition wherein the pulses appear at the forward rotational output terminal 65 while if desired to have the output pulses appear at the terminal 71, the switch 75 is operated to connect the negative supply 31 through the resistance 74 to the junction of elements 72 and 73. This produces an essentially zero potential at the cathode of the diode 72 which prevents conduction therethrough when the transistor 56 is not conducting. However, upon conduction therethrough, the positive potential in the lead 64 decreases, making the cathode potential of the diode 72 negative to thereby permit current to flow through the diode 72 causing a negative pulse to appear at the terminal 71. In addition by having the switch 75 effect the appearance of negative pulses at the output terminal 71, pulses at the terminal 65 are prevented by the application of substantially zero voltage through the resistances 69 and 68 from the negative supply 31 to the anode of diode 67. Condensers 77 and 78 are connected as shown to the negative supply 31 and the ends of resistor 69 to provide filtering.

It will be understood that upon the receipt of a signal through the lead 29 to the transistor 44 that occurs when the condition of the counting means corresponds to the position of the pulse number selecting means, that the transistor 44 conducts to change the state of the transistors 32 and 33. The production of negative pulses at the output terminal either 65 or 71 ceases and in addition a completion signal is made to appear, by reason of conduction through a transistor 79, between the positive lead 30 and a point 80. While the completion signal if desired may be a simple pulse, it consists in the embodiment herein described of a substantially constant direct current voltage that permits current to pass through the emitter-collector circuit of transistor 79 and the biasing diode 63 to the negative supply 31. For effecting the conduction of the transistor 79, the base thereof is connected through resistors 81 and 82 to the output signal point 34 and through a biasing resistance 83 to the negative supply 31. Thus the transistor 79 is capable of conducting when the voltage at the point 34 is increased to overcome the negative bias produced by the resistor 83 and diode 63 and the capability of conduction is maintained so long as this condition exists. Thus a relay or other actuatable device connected between the terminal 80 and the positive terminal 30 may be actuated by the completion signal to thereby permit external machines controllable by such a relay to have their operation initiated.

When the last pulse of the selected number of pulses has appeared at the output terminal and the cycle ended, the device herein causes a resetting of the counting means to zero. Further, so long as the device is not supplying pulses, the resetting is maintained at its zero count thereby obviating the chance occurrence that stray electrical noise may cause the counting means not to be at its zero count when a cycle begins. The resetting means functions upon the change of state of the transistors 32 and 33 to the transistor 33 conducting and includes a pair of transistors 84 and 85 which in effect reset the counting means by placing selected points thereof at substantially ground potential. The transistor 84 is connected to the output point 35 and is caused to be conducting between the positive and negative terminals 30 and 31 through resistances 86 and 87 when the potential of the point 35 becomes low. This in turn effects conduction of the transistor 85 by placing on the base thereof a positive potential which is greater than a negative bias supplied by a resistance 88 and diode 63. Upon the conduction of the transistor 85, each of the binary counters 20a through 20d and 21a through 21d is grounded to thereby set each decade of the counters in a condition which indicates the zero count. Moreover, as the transistor 85 is maintained conducting whenever the transistor 33 is conducting, it maintains the binary counters at the zero count.

In the operation of the circuit shown in FIG. 2, assuming that the device is energized and is not producing pulses, the transistor 33 is conducting to place the control gate 17 in the other state condition wherein the reset transistor 85 is conducting resetting each of the binary counters to the binary notation of zero and the transistor 79 is conducting to produce the output completion signal at the terminal 80. In addition by reason of the point 35 having a relatively low potential the unijunction transistor 55 does not have sufficient voltage thereacross to cause conduction through its emitter-base junction. Thus there is no conduction through the transistor 56 and no output pulses appear at an output terminal. The switches 26 and 27 can be set to the number of cycles desired, for example, if 36 pulses are desired the switch contacts 26a, 26b and 26c will be placed in the dotted line position 26d for the one's digit 6 and the switch contacts 27a, 27b and 27c in the dotted line position 27d for the ten's digit 3. Pulses are supplied to the output terminal 65 when the switch 51 is closed to reduce the potential at the point A which through the coupling capacitor 49 supplies a trigger signal to the base of transistor 33. This changes the state of transistors 32 and 33 and also by reason of the increase in potential at the output point 35 and the lowering of the potential at the output point 34, transistor 79 ceases conduction as do transistors 84 and 85. Moreover, the unijunction transistor 55 with its RC network of elements 57, 58 and 59 begins its cycling with the frequency determined by the adjustment of the resistor 58. Additionally, the transistor 44 is now reversely biased to be not conducting and this change occurred when the switches 26 and 27 were set at a position other than the zero position.

The unijunction transistor 55 after a selected time has conduction through its emitter-base junction and causes transistor 56 to conduct, lowering the voltage in the lead 64 to produce a pulse which is transmitted to the terminal 65 (as the switch 75 is in its solid line position) and to the lead 22. The latter causes the condition of the binary counters to change from the zero count to the one count. The conduction of the transistor 56 ceases by reason of the discharge of condenser 59. The RC time constant elements then again after a preselected time effect conduction through the emitter-base junction of the unijunction transistor 55 and conduction through the transistor 56 with subsequent pulses appearing at a predetermined interval at the terminal 65 and at the input lead 22 to the binary counters.

The pulses continue to appear at the output terminal until the binary counters reach a condition that corresponds to the position of the switches 26 and 27 at which time a low potential appears in the lead 29 which is sufficient to decrease the reverse bias on the transistor 44 previously caused by the high potential in the lead 29 and thereby effect conduction of the transistor 44. The latter then produces the triggering signal for shifting the state of the control gate from transistor 32 conducting to transistor 33 conducting and stopping the appearance of pulses at the output terminal. The binary counters are connected in the first decade 20 with gating which effects the condition of the decade at the number 9 by stopping the next pulse from changing the state of decades 20b and 20c while changing decades 20a and 20d thereby resetting the decade to zero and generating a pulse through the lead 23 to the second decade which counts the ten's digits. Thus at the 6 pulse while there is a low voltage condition appearing in the switch 26 a high voltage appears at the switch 27 and hence prevents operation of the transistor 44. However, after the 36th pulse has set the condition of the first decade to the position 6 and the second decade to the condition of the digit 3, it will be appreciated that a low voltage appears in the lead 29. Thus the contact 26a has no voltage thereacross by reason of its being in engagement with the open point in the position 26d, contact 26b has a low voltage thereat by reason of counter 20b being in the 1 state, contact 26c has a low voltage thereat by reason of the counter 20c also being in the 1 state and the counter 20d has no effect in this position. In the switch 27, the contact 27a has a low voltage thereat by reason of the counter 21a being at the 1 state and the same is true for contact 27b as the counter 21b is in the 1 state and the contact 27c is at an open point. Thus of the six contacts at any one of which a high voltage may appear which is sufficient to prevent conduction of the transistor 44, there is in this position, wherein the switches 26 and 27 are set to stop the pulse operating device after 36 pulses, a low potential on the lead 29 sufficient to trigger the control gate to stop output pulses from appearing at the output terminal. This completes the cycle until the switch 51 is operated again to initiate another cycle.

While switch 51 has been described as being manually operated to momentarily close it, it will be understood by those skilled in the art that for starting each cycle to produce the desired number of pulses, it is within the scope of the present invention to use instead of a manual switch, automatic switching such as a time switch or a switch operated by exterior equipment at the completion of an operation.

Figure 3:
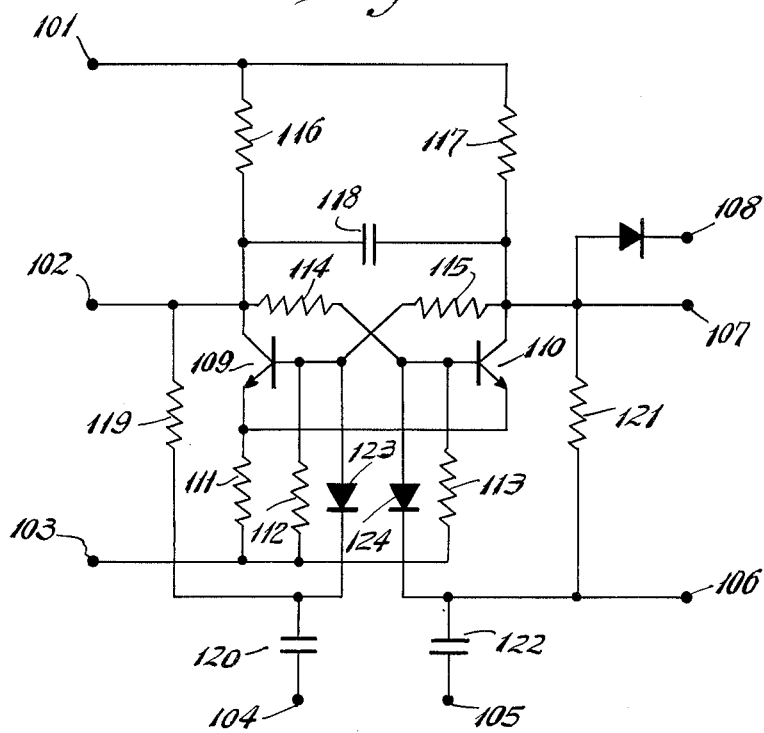
FIG. 3 is an electrical schematic diagram of an embodiment of a binary counter constituting part of the present invention.

Referring to FIG. 3 there is shown a schematic diagram of a binary counter which is employed in the present invention. This binary counter, as shown, has terminals 101, 102, 103, 104, 105, 106, 107 and 108 thereto. For correlating the schematic diagram of the binary counters to the block diagram of the counters shown in FIG. 2, each of the terminals 101 to 108 is indicated in at least the binary counter 20a, the other counters having the same connections. More specifically terminal 101 is for connection to the positive supply 30, terminal 102 for connection to the pulse number selecting means 16, terminal 103 for connection to the negative supply 31, terminals 104 and 105 for accepting input signals, terminal 106 for gating control and is employed only in the counters 20b and 21b for causing the binary counters to become decade counters, terminal 107 in which the output from the counter appears and terminal 108 for connection to the transistor 85 for resetting the counter at the termination of the cycle.

The counter is essentially a bistable, base triggered flip-flop circuit. The counter includes transistors 109 and 110 together with biasing resistors 111, 112 and 113, the former in the emitter circuits and the latter two in the base circuits, connected as shown to the negative supply terminal 103. Further components include bias resistances 114 and 115 connected between the collector of one transistor and the base of the other.

According to the present invention, the counter is designed to obviate and minimize the effect of spurious electrical noise such as may be introduced in the power supply terminals 101 and 103 or in any of the other terminals. This is achieved with respect to the terminals 101 and 103 by substantially increasing the duration of any noise which, if it appears at these power supply terminals is capable of effecting the counter, and hence noise having less duration is of no effect. Accordingly there is provided an RC network consisting of resistors 116, 117 and condenser 118 connected in the manner shown to the collectors and the terminal 101. Thus should a false signal or noise appear in the power supply terminal 101 in order for it to effect the state of the binary counter, it is necessary that it have a duration longer than the time constant determined by the three elements 116, 117 and 118. Preferably these elements have a time constant approximating one millisecond.

In addition there is provided between the terminal 102 and terminal 104 a resistance 119 and a condenser 120. Similarly a resistance 121 and condenser 122 are provided for the terminal 105. The trigger signal to the terminals 104 and 105 in the lead 22 is a negative pulse and as such is passed through the condensers 120 and 122 and through diode 123 to the base of transistor 109 from the terminal 104 or through diode 124 from the terminal 105 to the transistor 110. The signal is employed to decrease the base voltage of a transistor that is conducting and thus causes a change in state of the counter. The resistances 119 and 121 serve to guide the trigger signal to the conducting transistor as the resistor for the non-conducting transistor provides a positive blocking bias at the junction of the condenser and the diode. Thus if transistor 109 is conducting, the diode 124 is reversely biased by the resistance 121. It will be understood that when the transistor 109 is conducting that the terminal 102 has a low potential thereon and hence the binary counter is in the 1 state. When the counter shifts its state to the 0 state, transistor 110 then conducts with a high to low positive potential signal being developed at the terminal 107 and this is transmitted to the next counter. When the counter is reset to the 0 state upon completion of a cycle, a low resistance path to the negative supply from the terminal 108 through the transistor 85 causes the potential at the collector of transistor 110 to be low which renders transistor 109 nonconducting. Naturally if the transistor 110 is already conducting there will be no change of state in the counter.

The terminal 106 is employed as heretofore mentioned to conduct a gating signal between the counter 20d and the counter 20b, while the output terminal 107 of the counter 20a is additionally connected to the terminal 104 of the counter 20d, these connections providing the changing of the binary counter to the decimal counting system. The decade 21 has similar connections between counters 21d and 21b and 21a and 21d.

In addition to providing binary counters which are not only relatively slow in changing their state but also require signals of relatively long duration to effect their change of state, the present invention also provides for substantially minimizing these effects on the control gate. Thus it will be appreciated that the resistances 38 and 39 and condenser 40 also constitute an RC network which is designed to require a signal of relatively long duration before it is capable of effecting the operation of the control gate.

In order for those skilled in the art to more fully practice the invention, the following values and types of the various elements and components are hereinafter set forth, though it is to be understood that the recitation is only illustrative and the invention is not to be limited thereto. The counter has resistors (ohms) 111 (150), 112, 113 (3.3K), 114, 115 (8.2K), 116, 117 (1.5K) and 119, 121 (10K); condensers 118, 120 and 122, .05 mfd.; diodes 123, 124—type TI57; and transistors 109, 110—type 2N1302. The other elements and components shown in FIG. 2 are resistors (ohms) 36, 37 (4.7K), 38, 39 (680), 41, 42, 86, 87, 88 (3.3K), 43 (82), 45, 46, 47, 68, 69 (5.6K), 50 (47), 53 (220K), 57 (3.9K), 58 (500K), 60 (220), 61 (100), 62 (470), 70 (1K), 74 (10K), 81, 83 (1.2K) and 82 (2.2K); condensers (mfd.) 40, 48, 49, 54 (.01), 59 (.56) and 66, 73, 77, 78 (.05); diodes 63, 67, 72—type TI57; and transistors (type) 32, 33, 56, 79, 85—2N1302, 44, 84—2N1303 and 55—4JD5B2T.

It will accordingly be appreciated that there has been disclosed a device for producing a predetermined number of pulses and then ceasing cessation thereof until the device is again actuated. The number of pulses per cycle of operation may be selected within the capabilities of the device and while in the embodiment specifically disclosed herein 99 pulses is the maximum, it is of course obvious that more decades of counters and switches could be added to increase the maximum number. The device has a counting means consisting of decimal coded binary counters which have a condition thereof for each pulse counted and in addition the pulse number selecting means specifically consisting of the switches 26 and 27, has a plurality of positions, there being one position for each condition. Thus when the position set by the pulse number selecting means corresponds to the condition reached by the binary counters, a signal is produced which causes the cessation of the pulse at the output terminal. Moreover upon this occurring, there is a change in state of the control gate which produces a signal that resets the counters to zero and in addition provides a completion signal by which external mechanism may be operated if desired at the end of the cycle. The present invention not only provides for producing pulses on one output channel but in addition includes switch means whereby pulses may be made to appear on another channel thereby facilitating the usage of the pulse supplying device with a motor control for controlling the direction of rotation of a motor in addition to controlling the magnitude of movement.

Variations and modifications may be made within the scope of the claims and portions of the improvements may be used without others.

We claim:
1. A pulse producing device for supplying a selected number of pulses per cycle of operation for controlling the extent and direction of movement of a stepping motor comprising output terminals at which the pulses appear and including a first channel and a second channel, switch means for controlling the appearance of the pulses on one or the other channels thereby controlling the direction of movement of said motor; oscillator means for producing individual pulses and including means for adjusting the frequency of the pulses to thereby vary the speed of the motor and including means interconnecting the oscillator means to the output terminals to have the pulses appear at the output terminals; control means interconnected with the oscillator means and having a first state which permits pulses to appear at the output terminals and a second state for preventing pulses from appearing at the output terminals; counting means connected to receive the output pulses and having a plurality of conditions, one for each pulse supplied during the cycle; pulse number selecting means having a plurality of positions, one for each condition of the counting means, connected to the control means and the counting means and having means for selecting one of the positions, said selecting means becoming actuated when the one condition of the counting means corresponds to the one selected position of the selecting means; and connections between the selecting means and the control means for causing actuation of the selecting means to effect a change of state of the control means to its second state to thereby terminate the cycle by preventing further pulses from appearing at the output terminals.

2. A pulse producing device for supplying a selected number of pulses per cycle of operation for controlling the extent and direction of movement of a stepping motor comprising output terminals at which the pulses appear and including a first channel and a second channel, switch means for controlling the appearance of the pulses on one or the other channels, to thereby control the direction of movement of said motor; oscillator means for producing individual pulses and including means interconnecting the oscillator means to the output terminals to have the pulses appear at the output terminals; control means interconnected with the oscillator means and having a first state which permits pulses to appear at the output terminals and a second state for preventing pulses from appearing at the output terminals; counting means connected to receive the output pulses and having a plurality of conditions, one for each pulse supplied during the cycle; pulse number selecting means having a plurality of positions, one for each condition of the counting means, connected to the control means and the counting means and having means for selecting one of the positions, said selecting means becoming actuated when the one condition of the counting means corresponds to the one selected position of the selecting means; and connections between the selecting means and the control means for causing actuation of the selecting means to effect a change of state of the control means to its second state to thereby terminate the cycle by preventing further pulses from appearing at the output terminals.

3. The invention as defined in claim 2 in which there is provided reset means connected to the counting means and the control means for resetting the counting means to a zero count when the control means is in its second state.

4. The invention as defined in claim 3 in which the reset means maintains the counting means for the duration that the control means is in its second state.

5. A pulse producing device for supplying a selected number of pulses per cycle of operation for controlling the extent and direction of movement of a stepping motor comprising output terminals at which the pulses appear and including a first channel and a second channel, switch means for controlling the appearance of the pulses on one or the other channels thereby controlling the direction of movement of said motor; oscillator means for producing individual pulses and including means interconnecting the oscillator means to the output terminals to have the pulses appear at the output terminals; control means interconnected with the oscillator means and having a first state which permits pulses to appear at the output terminals and a second state for preventing pulses from appearing at the output terminals, said control means including a bistable flip-flop circuit having a pair of trigger points and means including a resistance-capacitance network interconnected with the trigger points for increasing the duration of a signal required to change the state of the flip-flop circuit; counting means connected to receive the output pulses and having a plurality of conditions, one for each pulse supplied during the cycle; pulse number selecting means having a plurality of positions, one for each condition of the counting means, connected to the control means and the counting means and having means for selecting one of the positions, said selecting means becoming actuated when the one condition of the counting means corresponds to the one selected position of the selecting means; and connections between the selecting means and the control means for causing actuation of the selecting means to effect a change of state of the control means to its second state to thereby terminate the cycle by preventing further pulses from appearing at the output terminals.

6. A pulse producing device for supplying a selected number of pulses per cycle of operation for controlling the extent and direction of movement of a stepping motor comprising output terminals at which the pulses appear and including a first channel and a second channel, switch means for controlling the appearance of the pulses on one or the other channels thereby controlling the direction of movement of said motor; oscillator means for producing individual pulses and including means interconnecting the oscillator means to the output terminals to have the pulses appear at the output terminals; control means interconnected with the oscillator means and having a first state which permits pulses to appear at the output terminals and a second state for preventing pulses from appearing at the output terminals; counting means connected to receive the output pulses and having a plurality of conditions, one for each pulse supplied during the cycle, said counting means including a plurality of bistable flip-flop circuits with each having output terminals and means in each circuit including a resistance-capacitance network interconnected in each circuit and with at least one condenser connected between the output terminals for increasing the duration of a signal required to change the state of the flip-flop circuit; pulse number selecting means having a plurality of positions, one for each condition of the counting means, connected to the control means and the counting means and having means for selecting one of the positions, said selecting means becoming actuated when the one condition of the counting means corresponds to the one selected position of the selecting means; and connections between the selecting means and the control means for causing actuation of the selecting means to effect a change of state of the control means to its second state to thereby terminate the cycle by preventing further pulses from appearing at the output terminals.

7. A pulse producing device for supplying a selected number of pulses per cycle of operation for controlling the extent and direction of movement of a stepping motor comprising output terminals at which the pulses appear and including a first channel and a second channel, switch means for controlling the appearance of the pulses on one or the other channels to thereby control the direction of movement of said motor; oscillator means for producing individual pulses at a substantially constant frequency and including means for adjusting the frequency and including means interconnecting the oscillator means to the output terminals to have the pulses appear at the output terminals; control means interconnected with the oscillator means and having a first state which permits pulses to appear at the output terminals and a second state for preventing pulses from appearing at the output terminals, said control means including a bistable flip-flop circuit having a pair of trigger points and means including a resistance-capacitance network interconnected with the trigger points for increasing the duration of a signal required to change the state of the flip-flop circuit; counting means connected to receive the output pulses and having a plurality of conditions, one for each pulse supplied during the cycle, said counting means including a plurality of bistable flip-flop circuits and means in each circuit for increasing the duration of a signal required to change the state of the flip-flop circuit; pulse number selecting means having a plurality of positions, one for each condition of the counting means, connected to the control means and the counting means and having means for selecting one of the positions, said selecting means becoming actuated when the one condition of the counting means corresponds to the one selected position of the selecting means; connections between the selecting means and the control means for causing actuation of the selecting means to effect a change of state of the control means to its second state to thereby terminate the cycle by preventing further pulses from appearing at the output terminals; reset means connected to the counting means and the control means for resetting and maintaining all of the flip-flop circuits of the counting means to a zero count for the duration that the control means is in its second state; and completion signal means connected to the control means for producing a signal when the control means is in its second state.

References Cited by the Examiner
UNITED STATES PATENTS

| | | | |
|---|---|---|---|
| 2,519,184 | 8/1950 | Grosdoff | 328—48 |
| 2,524,123 | 10/1950 | Dickinson | 328—48 |
| 2,988,275 | 6/1961 | Thomason | 328—48 |
| 3,002,151 | 9/1961 | Broderick et al. | 328—48 |
| 3,046,526 | 7/1962 | Scantlin | 307—88.5 |
| 3,096,483 | 7/1963 | Ransom | 328—48 |

ARTHUR GAUSS, *Primary Examiner.*

JOHN KOMINSKI, *Examiner.*